(12) United States Patent
Kitaguchi et al.

(10) Patent No.: US 11,261,134 B2
(45) Date of Patent: Mar. 1, 2022

(54) HONEYCOMB FORMED BODY AND METHOD FOR PRODUCING HONEYCOMB STRUCTURE

(71) Applicant: NGK INSULATORS, LTD., Nagoya (JP)

(72) Inventors: Daniel Yukichi Kitaguchi, Nagoya (JP); Kouhei Kato, Nagoya (JP); Shotaro Matsumoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 191 days.

(21) Appl. No.: 16/282,743

(22) Filed: Feb. 22, 2019

(65) Prior Publication Data

US 2019/0300444 A1    Oct. 3, 2019

(30) Foreign Application Priority Data

Mar. 27, 2018 (JP) .............................. JP2018-060715

(51) Int. Cl.
  *B01D 46/00* (2006.01)
  *C04B 38/00* (2006.01)
  *B28B 11/24* (2006.01)
  *B28B 11/08* (2006.01)
  *C04B 35/195* (2006.01)
  (Continued)

(52) U.S. Cl.
  CPC ...... *C04B 38/0009* (2013.01); *B01D 46/2418* (2013.01); *B28B 11/04* (2013.01); *B28B 11/0818* (2013.01); *B28B 11/243* (2013.01); *C04B 35/195* (2013.01);
  (Continued)

(58) Field of Classification Search
  None
  See application file for complete search history.

(56) References Cited

U.S. PATENT DOCUMENTS

2005/0255288 A1\* 11/2005 Noguchi ............. C04B 38/0006
                                                            428/116

FOREIGN PATENT DOCUMENTS

JP         4896171 B2 \*   3/2012
JP      2018122244 A  \*   8/2018
               (Continued)

OTHER PUBLICATIONS

Mori, machine translation of JP 4896171 Abstract and Description, Mar. 14, 2012 (Year: 2012).\*
(Continued)

*Primary Examiner* — Mary I Omori
(74) *Attorney, Agent, or Firm* — Burr & Brown, PLLC

(57) ABSTRACT

A honeycomb formed body containing a ceramics raw material, the honeycomb formed body including: a pillar shaped honeycomb structure portion having a plurality of rectangular cells, the cells being defined by partition walls and extending from a first end face to a second end face to form flow paths; an outer peripheral portion having outer peripheral portions X where the partition walls are covered with an outer peripheral wall; and outer peripheral portions Y where the partition walls are exposed. Each of the outer peripheral portions X includes a tapered portion having a gradually deceasing thickness of the outer peripheral wall toward a boundary portion with an adjacent outer peripheral portion Y. The tapered portion requires a length equal to or more than one time of an average cell pitch in the outer peripheral direction until thickness of the outer peripheral wall is halved.

9 Claims, 7 Drawing Sheets

(51) Int. Cl.
*B28B 11/04* (2006.01)
*B01D 46/24* (2006.01)
(52) U.S. Cl.
CPC .. *C04B 38/0012* (2013.01); *B01D 2046/2481* (2013.01); *C04B 2235/3481* (2013.01)

(56) References Cited

FOREIGN PATENT DOCUMENTS

| WO | 2009/035049 A1 | 3/2009 | |
| WO | WO-2009035049 A1 * | 3/2009 | ........... C04B 35/195 |

OTHER PUBLICATIONS

Universal Cutter-GrinderOperating Handbook, ICS Cutting Tools, Inc., Mar. 9, 2016 (Year: 2016).*
Suenobu et al., machine translation WO 2009/035049 Abstract, Claims and Description, Mar. 19, 2009 (Year: 2009).*

* cited by examiner

[FIG. 1]
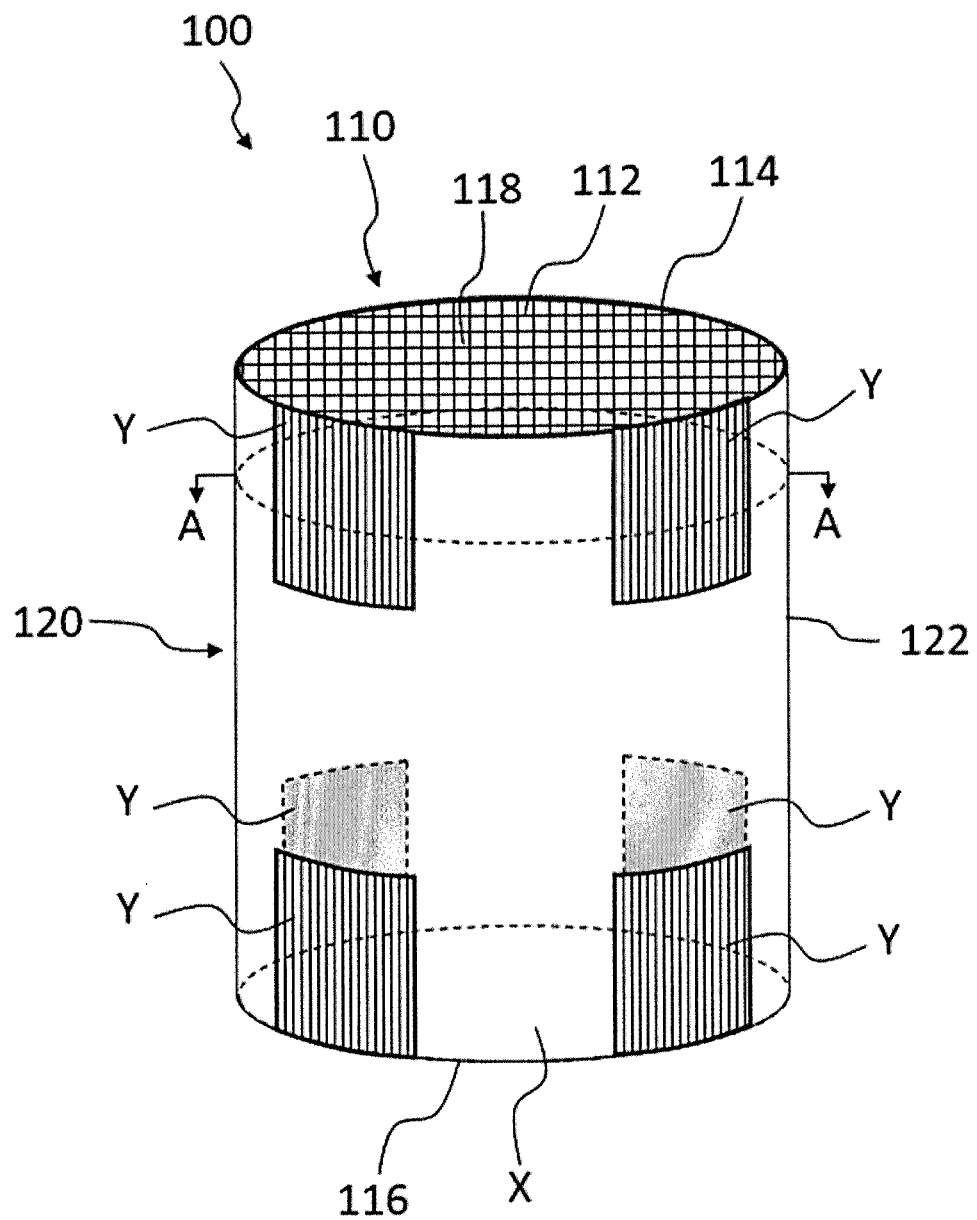

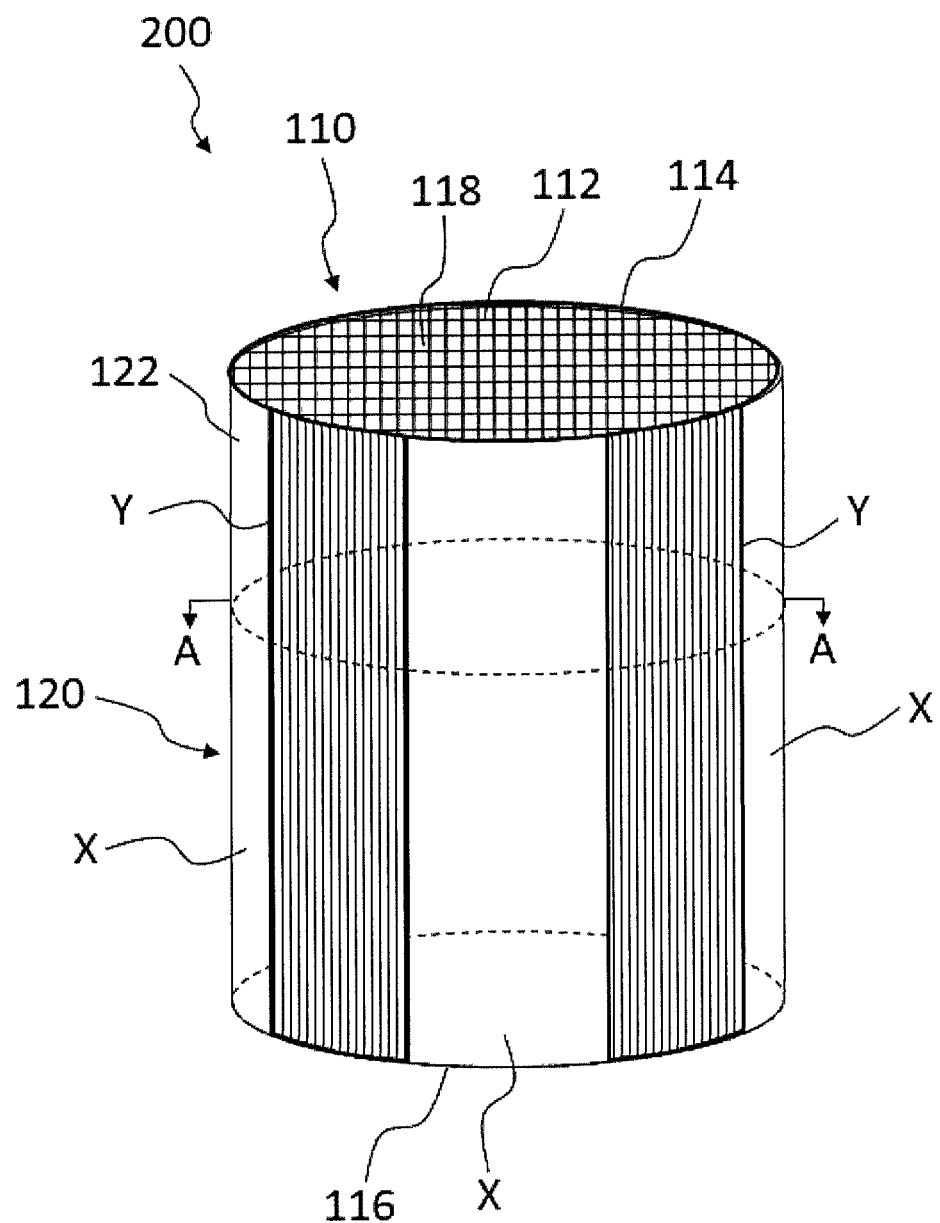
[FIG. 2]

[FIG. 3-1]
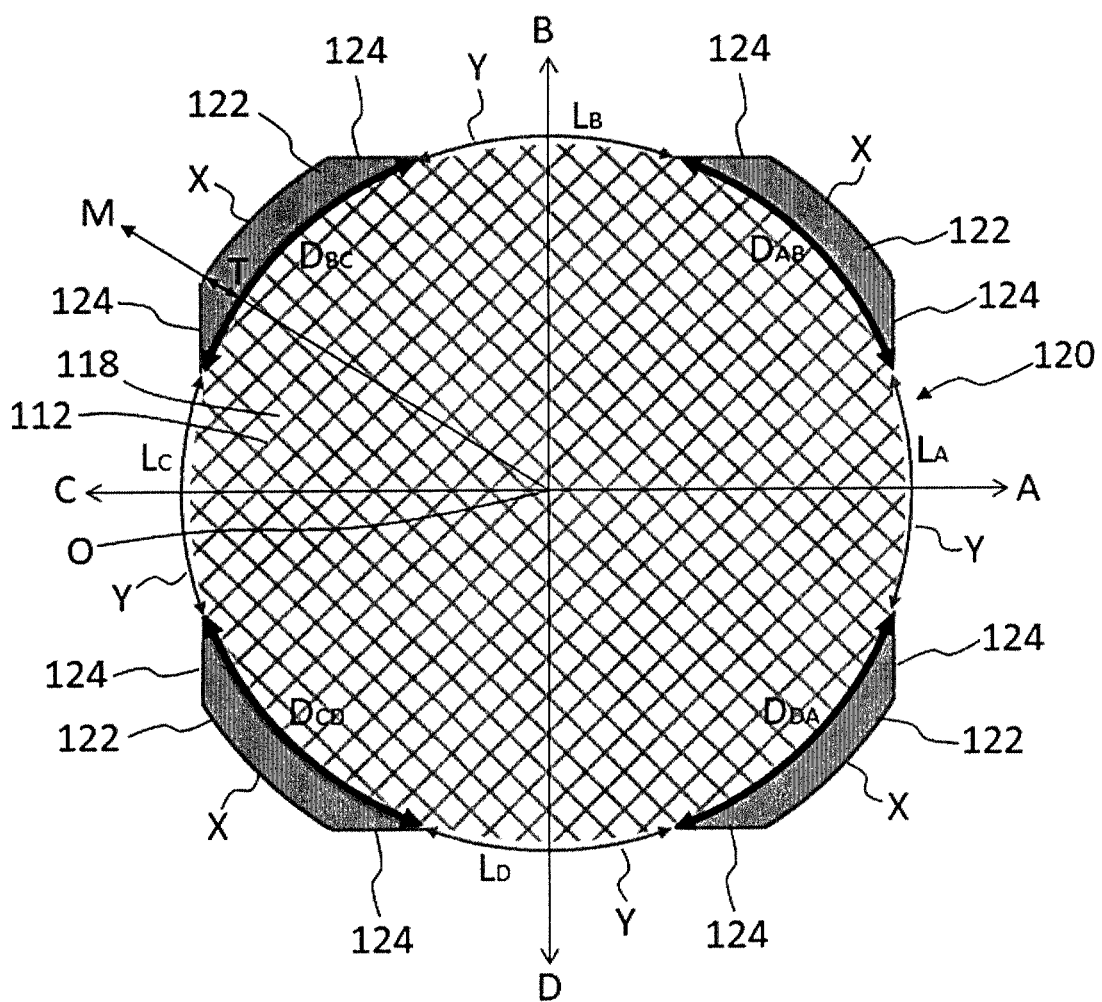

[FIG. 3-2]
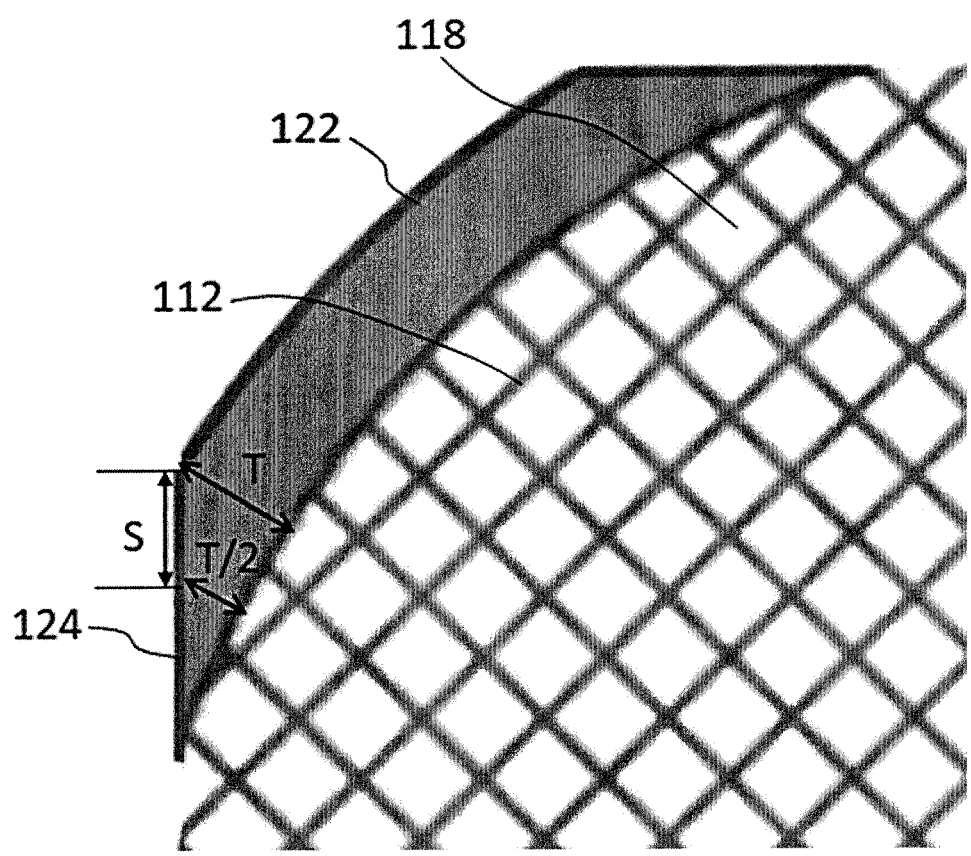

[FIG. 4]
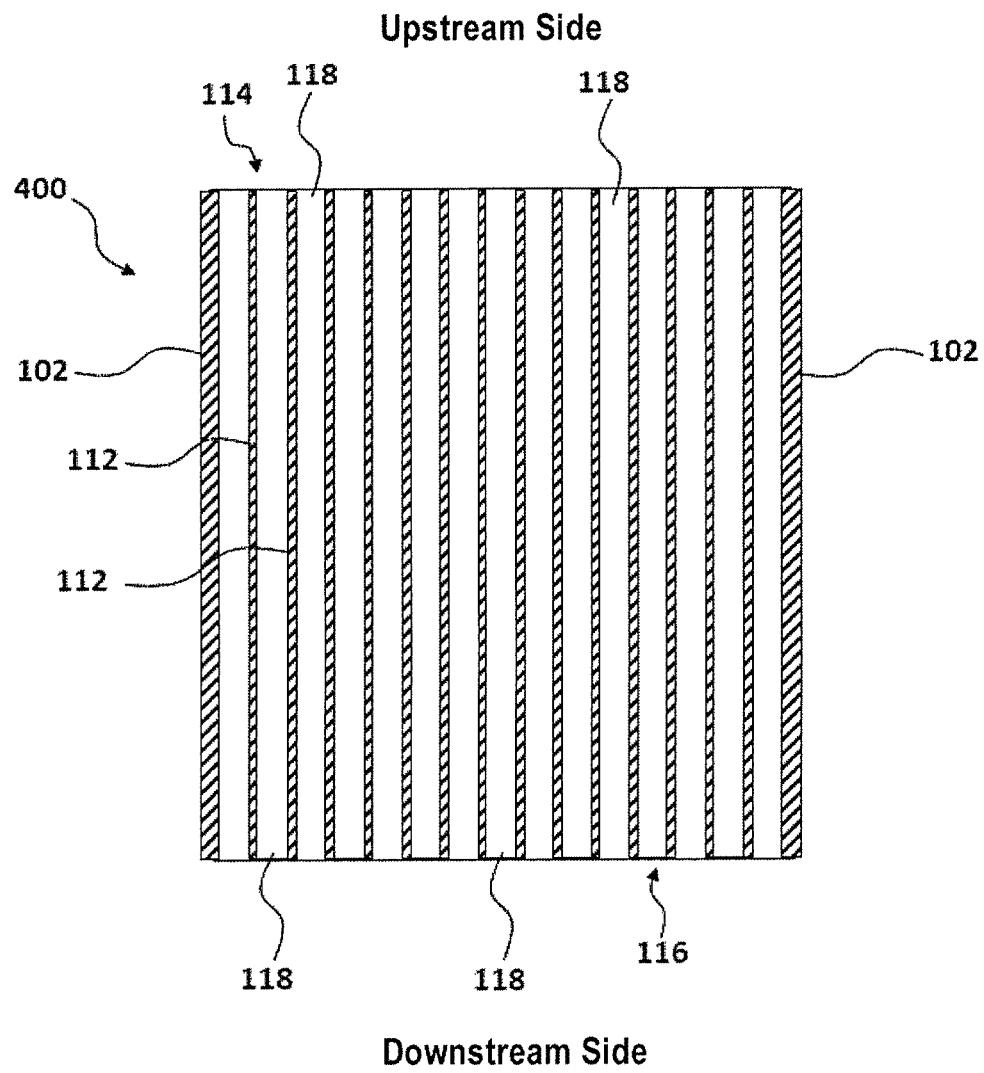

[FIG. 5]
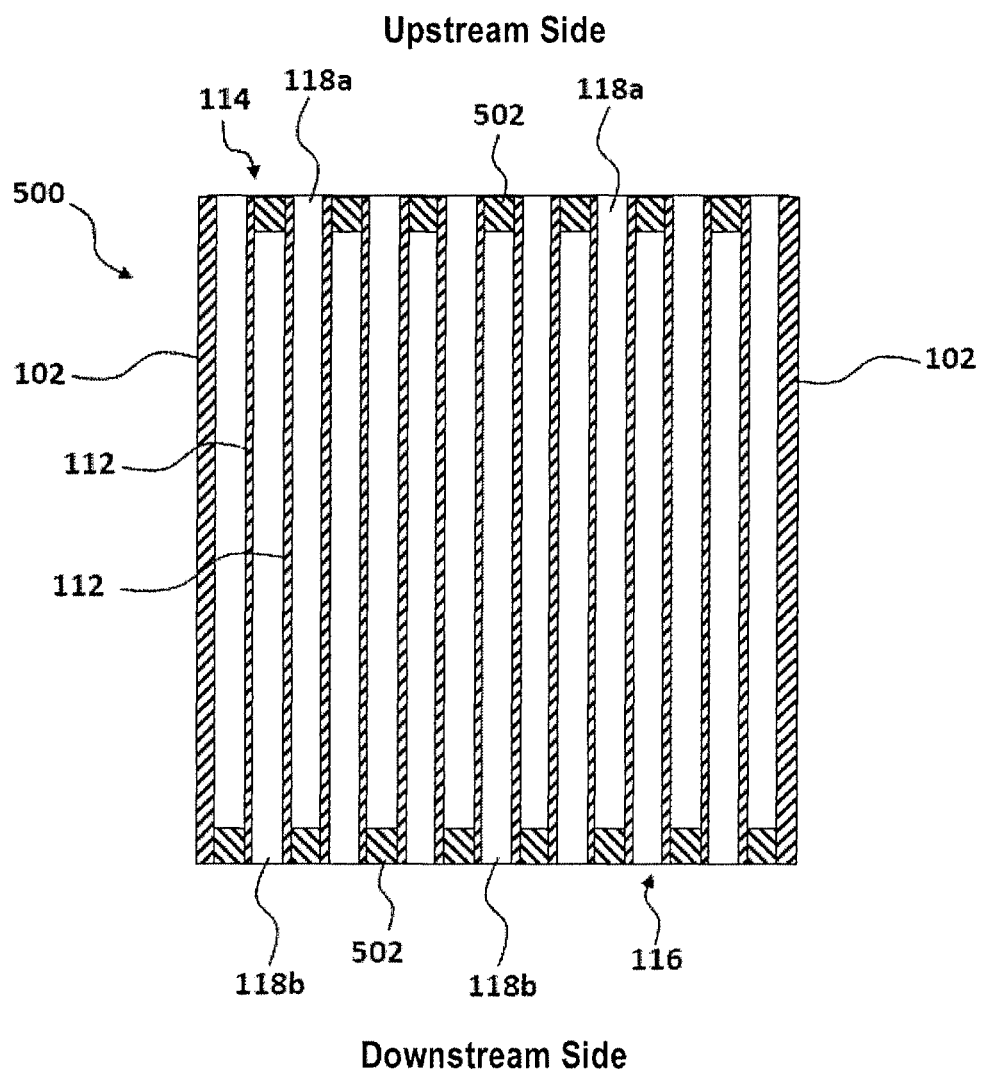
Upstream Side
Downstream Side

[FIG. 6]
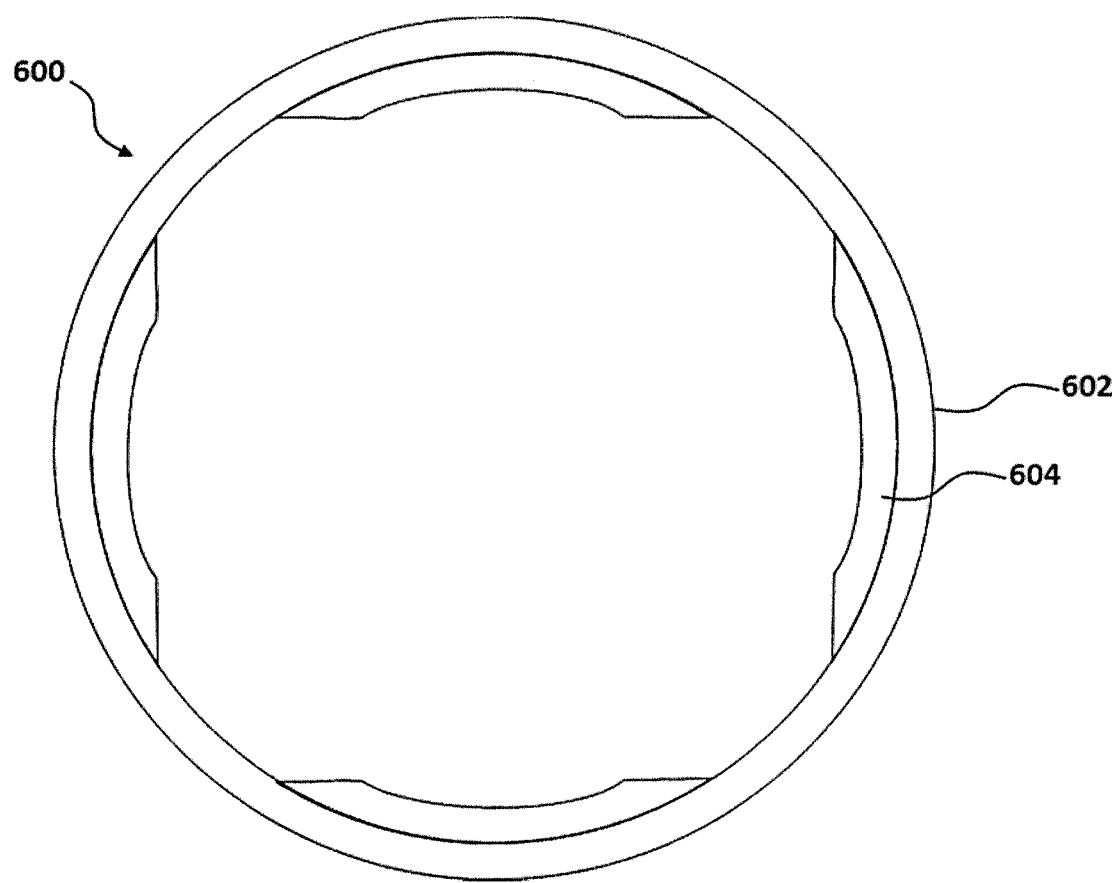

HONEYCOMB FORMED BODY AND METHOD FOR PRODUCING HONEYCOMB STRUCTURE

This application claims the benefit under 35 USC § 119(a)-(d) of Japanese Application No. 2018-060715 filed Mar. 27, 2018, the entirety of which is incorporated herein by reference.

FIELD OF THE INVENTION

The present invention relates to a honeycomb formed body. The present invention also relates to a method for producing a honeycomb structure made through a step of firing the honeycomb formed body.

BACKGROUND OF THE INVENTION

Exhaust gases emitted from internal combustion engines represented by automobile engines contain pollutants such as particulate matters (PMs) such as soot, nitrogen oxide (NOx), soluble organic components (SOFs), hydrocarbons (HCs) and carbon monoxide (CO). Therefore, honeycomb structure bodies having a pillar shaped honeycomb structure on which an appropriate catalyst (an oxidation catalyst, reduction catalyst, three-way catalyst, or the like) is supported depending on pollutants have been widely used in exhaust gas systems for internal combustion engines.

In general, a honeycomb structure is produced through a step of firing a honeycomb formed body. Conventionally, when firing the honeycomb formed body in a step of producing the honeycomb structure, a problem may be caused that cracks (which may be referred to as "breakage") developed from an outer peripheral wall are generated. The problem of cracks has become remarkable as the honeycomb structure has become larger.

To address the problem of the cracks, WO 2009/035,049 A1 (Patent Document 1) proposes a method for producing a honeycomb structure, comprising firing a honeycomb formed body having a ground portion where an outer peripheral wall is ground in a width range of from 10 to 100 mm including "a 45° direction portion" relative to "a 0° direction portion" of the outer peripheral wall, in which, in a cross section perpendicular to a central axis direction of the honeycomb formed body, the "0° direction" is defined as a direction from the center toward the outer peripheral wall along one partition wall, and the "0° direction portion" is defined as a portion where a straight line extending in the 0° direction intersects with the outer peripheral wall. The patent document mentions that the use of the honeycomb formed body removes the outer peripheral wall at the "45° direction portion" where a stress (tensile stress) tends to concentrate, so that even if a larger honeycomb structure is produced, the stress concentration of the outer peripheral wall near the "45° direction portion" can be eliminated, thereby suppressing generation of cracks due to the stress concentration of the outer peripheral wall during the firing.

CITATION LIST

Patent Literature

Patent Document 1: WO 2009/035049 A1

SUMMARY OF THE INVENTION

Technical Problem

Recently, there is a need for further improvement of a yield rate during production of a honeycomb structure. According to the technique described in Patent Document 1, cracks are suppressed during firing. However, there is still room for improvement.

The present invention has been made in view of the above circumstances. In one embodiment, an object of the present invention is to provide a honeycomb formed body that can further suppress the generation of cracks during firing. In another embodiment, an object of the present invention is to provide a method for producing a honeycomb structure using such a honeycomb formed body.

Solution to Problem

As a result of intensive studies to solve the above problems, the present inventors have found that when a step close to a right angle is present at a boundary between the ground portion of the outer peripheral wall and the non-ground portion of the outer peripheral wall, a stress will concentrate at the boundary and cracks will tend to occur. Therefore, the present inventors have found that when the boundary between the ground portion of the outer peripheral wall and the non-ground portion of the outer peripheral wall is provided with a tapered portion where a thickness of the outer peripheral wall is gradually decreased from the non-ground portion of the outer peripheral wall toward the ground portion of the outer peripheral wall, the generation of the cracks can be significantly suppressed. The present invention has been completed based on the above findings, and is illustrated below.

[1] A honeycomb formed body containing a ceramics raw material, the honeycomb formed body comprising:

a pillar shaped honeycomb structure portion having a plurality of rectangular cells, the cells being defined by partition walls and extending from a first end face to a second end face to form flow paths;

an outer peripheral portion comprising: outer peripheral portions X where the partition walls are covered with an outer peripheral wall; and outer peripheral portions Y where the partition walls are exposed;

wherein the honeycomb formed body has a cross-sectional portion satisfying the following four conditions:

the outer peripheral portions Y are arranged over four portions: a length portion $L_A$ of 3% or more and 14% or less of an outer peripheral length including an intersection portion between a straight line A and the outer peripheral portion, assuming that the outer peripheral wall is not present; a length portion $L_B$ of 3% or more and 14% or less of the outer peripheral length including an intersection portion between a straight line B and the outer peripheral portion, assuming that the outer peripheral wall is not present; a length portion LC of 3% or more and 14% or less of the outer peripheral length including an intersection portion between a straight line C and the outer peripheral portion, assuming that the outer peripheral wall is not present; and a length portion $L_D$ of 3% or more and 14% or less of the outer peripheral length including an intersection portion between a straight line D and the outer peripheral portion, assuming that the outer peripheral wall is not present; in which, when observing the honeycomb formed body in a cross section perpendicular to a height direction, the straight line A, the straight line B, the straight line C, and the straight line D respectively represent four straight lines extending from a center of gravity of a rectangular cell where the center of gravity is present at a position closest to a center of gravity of the cross section, through four corners of the rectangular cell, toward an outer periphery;

the outer peripheral portions X and the outer peripheral portions Y are alternately arranged in an outer peripheral direction;

each of the outer peripheral portions X comprises a tapered portion having a gradually decreasing thickness of the outer peripheral wall toward a boundary portion with an adjacent outer peripheral portion Y; and the tapered portion requires a length equal to or more than one time of an average cell pitch in the outer peripheral direction until thickness of the outer peripheral wall is halved.

[2] The honeycomb formed body according to [1], wherein the cross-sectional portion satisfying the four conditions comprises a first cross-sectional portion extending from the first end face over a length of 10% or more of the height of the honeycomb formed body in the height direction of the honeycomb formed body; and a second cross-sectional portion extending from the second end face over a length of 10% or more of the height of the honeycomb formed body in the height direction of the honeycomb formed body.

[3] The honeycomb formed body according to [1], wherein the cross-sectional portion satisfying the four conditions extends over the entire height direction of the honeycomb formed body.

[4] The honeycomb formed body according to any one of [1] to [3], wherein the outer peripheral wall excluding the tapered portions has an average thickness of 1.5 mm or less.

[5] The honeycomb formed body according to any one of [1] to [4], wherein, for the peripheral portions Y, the length portion $L_A$ is symmetrically formed with respect to the intersection portion between the straight line A and the outer peripheral portion as a center, the length portion $L_B$ is symmetrically formed with respect to the intersection portion between the straight line B and the outer peripheral portion as a center, the length portion $L_C$ is symmetrically formed with respect to the intersection portion between the straight line C and the outer peripheral portion as a center, and the length portion $L_D$ is symmetrically formed with respect to the intersection portion between the straight line D and the outer peripheral portion as a center.

[6] The honeycomb formed body according to any one of [1] to [5], wherein each of the rectangular cells is a square cell.

[7] The honeycomb formed body according to any one of [1] to [6], wherein the honeycomb formed body has a cylindrical shape.

[8] The honeycomb formed body according to any one of [1] to [7], wherein the plurality of rectangular cells comprise a first cell extending from the first end face to the second end face, the first end face being opened and the second end face being plugged; and a second cell adjacent to the first cell via the partition wall therebetween, the second cell extending from the first end face to the second end face, the first end face being plugged and the second end face being opened.

[9] A method for producing a honeycomb structure, comprising the steps of:

firing the honeycomb formed body according to any one of [1] to [8] to prepare a honeycomb fired body;

grinding an outer peripheral wall of the honeycomb fired body to prepare a ground honeycomb fired body; and forming an outer peripheral coating wall on an outer periphery of the ground honeycomb fired body.

Advantageous Effects of Invention

According to the honeycomb formed body of an embodiment of the present invention, cracks are less likely to generate during firing. This provides an industrially advantageous effect that a yield rate of the honeycomb structure produced through the step of firing the honeycomb formed body is improved.

BRIEF DESCRIPTION OF THE DRAWINGS

FIG. 1 is a schematic perspective view of a honeycomb formed body according to a first embodiment of the present invention.

FIG. 2 is a schematic perspective view of a honeycomb formed body according to a second embodiment of the present invention.

FIG. 3-1 is a schematic view of a cross section taken along the line A-A, which is perpendicular to a height direction (a cell extending direction) of a honeycomb formed body common to a first embodiment and a second embodiment.

FIG. 3-2 is a partially enlarged view of FIG. 3-1.

FIG. 4 is a schematic view of a cross section parallel to a height direction (a cell extending direction) of a honeycomb formed body according to an embodiment of the present invention.

FIG. 5 is a schematic view of a cross section parallel to a height direction (a cell extending direction) of a honeycomb formed body according to another embodiment of the present invention.

FIG. 6 is a schematic view of a jig having protruding portions that hinder formation of an outer peripheral wall.

DETAILED DESCRIPTION OF THE INVENTION

Embodiments of the present invention will now be described in detail with reference to the drawings. It is to understand that the present invention is not limited to the following embodiments and that design changes, improvements, and the like can be added as needed on the basis of ordinary knowledge of those skilled in the art without departing from the spirit of the present invention.

(1. Honeycomb Formed Body)

FIG. 1 shows a schematic perspective view of a honeycomb formed body according to a first embodiment of the present invention. FIG. 2 shows a schematic perspective view of a honeycomb formed body according to a second embodiment of the present invention. FIG. 3-1 shows a schematic view of a cross section taken along the line A-A, which is perpendicular to a height direction (a cell extending direction) of a honeycomb formed body common to the first embodiment and the second embodiment. FIG. 3-2 shows a partially enlarged view of FIG. 3-1.

Referring to FIGS. 1 and 2, each of a honeycomb formed body 100 according to a first embodiment and a honeycomb formed body 200 according to a second embodiment honeycomb includes:

a pillar shaped honeycomb structure portion 110 having a plurality of rectangular cells 118, the cells 118 being defined by partition walls 112 and extending from a first end face 114 to a second end face 116 to form flow paths; and an outer peripheral portion 120 including: outer peripheral portions X where the partition walls 112 are covered with an outer peripheral wall 122; and outer peripheral portions Y where the partition walls 112 are exposed.

The rectangular cell means that a shape of a cell in a cross section orthogonal to a height direction (a cell extending direction) of the honeycomb formed body is rectangular. In one embodiment, more than half of the cells of the honeycomb formed body are the rectangular cells. In another embodiment, among the cells of the honeycomb formed body, 70% or more of the cells are the rectangular cells. In yet another embodiment, among the cells of the honeycomb formed body, 90% or more of the cells are the rectangular cells. In yet another embodiment, among the cells of the honeycomb formed body, 95% or more of the cells are the rectangular cells. The reason why the present invention is directed to the rectangular cells is that generation of cracks is likely to occur in the case of the rectangular cells. According to the present invention, the generation of cracks can be effectively suppressed in the honeycomb formed body having the rectangular cells.

More than half of the total number of rectangular cells may be square cells, or 70% or more of the total number may be the square cells, or 90% or more of the total number may be the square cells, or all the rectangular cells may be square.

(1-1. Peripheral Structure)

The honeycomb structure 100, 200 has a cross-sectional portion satisfying the following four conditions when observed in a cross section perpendicular to a height direction and four straight lines extending from a center of gravity O of a rectangular cell where the center of gravity is present at a position closest to a center of gravity of the cross section, through the four corners of the rectangular cell, toward the outer periphery, are defined as a straight line A, a straight line B, a straight line C, and a straight line D, respectively, as shown in FIG. 3-1.

(1) The outer peripheral portions Y are arranged over four portions: a length portion $L_A$ of 3% or more and 14% or less of an outer peripheral length including an intersection portion between the straight line A and the outer peripheral portion 120, assuming that the outer peripheral wall 122 is not present; a length portion $L_B$ of 3% or more and 14% or less of the outer peripheral length including an intersection portion between the straight line B and the outer peripheral portion 120, assuming that the outer peripheral wall 122 is not present; a length portion $L_C$ of 3% or more and 14% or less of the outer peripheral length including an intersection portion between the straight line C and the outer peripheral portion 120, assuming that the outer peripheral wall 122 is not present; and a length portion $L_D$ of 3% or more and 14% or less of the outer peripheral length including an intersection portion between the straight line D and the outer peripheral portion 120, assuming that the outer peripheral wall 122 is not present.

(2) The outer peripheral portions X and the outer peripheral portions Y are alternately arranged in an outer peripheral direction.

(3) each of the outer peripheral portions X includes a tapered portion 124 having a gradually decreasing thickness of the outer peripheral wall toward a boundary portion with an adjacent outer peripheral portion Y; and (4) the tapered portion 124 requires a length equal to or more than one time of an average cell pitch in the outer peripheral direction until thickness of the outer peripheral wall 122 is halved.

According to the condition (1), the outer peripheral portions Y are arranged over four portions: the length portion $L_A$ of 3% or more and 14% or less of the outer peripheral length including the intersection portion between the straight line A and the outer peripheral portion 120, assuming that the outer peripheral wall 122 is not present; the length portion $L_B$ of 3% or more and 14% or less of the outer peripheral length including the intersection portion between the straight line B and the outer peripheral portion 120, assuming that the outer peripheral wall 122 is not present; the length portion $L_C$ of 3% or more and 14% or less of the outer peripheral length including the intersection portion between the straight line C and the outer peripheral portion 120, assuming that the outer peripheral wall 122 is not present; and the length $L_D$ of 3% or more and 14% or less of the outer peripheral length including the intersection portion between the straight line D and the outer peripheral portion 120, assuming that the outer peripheral wall 122 is not present.

In the vicinity of the intersection where each of the straight line A, the straight line B, the straight line C, and the straight line D intersects with the outer peripheral portion 120, cracks tend to be generated during the firing of the honeycomb formed body. While not wishing to be bound by any theory, it is believed that the generation of cracks is suppressed because a stress generated during the firing is released by the absence of the outer peripheral wall 122 in the vicinity of these intersections. In terms of effectively suppressing the generation of cracks, each of $L_A$, $L_B$, $L_C$, and $L_D$ is a length of 3% or more, more preferably a length of 4% or more, and still more preferably a length of 5% or more of the outer peripheral length assuming that the outer peripheral wall 122 is not present. However, if a region where the outer peripheral wall 122 is not present excessively spreads, it will be difficult to chuck the honeycomb formed body for fixing when it is subjected to processing such as cutting and/or transporting, because the chucking of the region where the outer peripheral wall 122 is not present will easily lead to crushing of the honeycomb formed body. Therefore, each of $L_A$, $L_B$, $L_C$, and $L_D$ is preferably a length of 14% or less, more preferably a length of 10% or less, and even more preferably a length of 8% or less of the outer peripheral length assuming that the outer peripheral wall 122 is not present.

In terms of homogeneity of the honeycomb formed body, it is preferable that the length portion $L_A$ is symmetrically formed with respect to the intersection portion between the straight line A and the outer peripheral portion as a center, and the length portion $L_B$ is symmetrically formed with respect to the intersection portion between the straight line B and the outer peripheral portion as a center, and the length portion $L_C$ is symmetrically formed with respect to the intersection portion between the straight line C and the outer peripheral portion as a center, and the length portion $L_D$ is symmetrically formed with respect to the intersection portion of the straight line D and the outer peripheral portion as a center.

The four length portions $L_A$, $L_B$, $L_C$ and $L_D$ configuring the outer peripheral portions Y may have different lengths, respectively. However, the lengths are preferably equal, in terms of homogeneity of the honeycomb formed body. Therefore, according to one preferred embodiment, $0.8 \leq L_B/L_A \leq 1.2$, $0.8 \leq L_C/L_A \leq 1.2$, and $0.8 \leq L_D/L_A \leq 1.2$ are simultaneously satisfied. In a more preferred embodiment, $0.9 \leq L_B/L_A \leq 1.1$, $0.9 \leq L_C/L_A \leq 1.1$, and $0.9 \leq L_D/L_A \leq 1.1$ are simultaneously satisfied. In an even more preferred embodiment, $L_A = L_B = L_C = L_D$ is satisfied.

According to the condition (2), the outer peripheral portions X and the outer peripheral portions Y are alternately arranged in the outer peripheral direction. As described above, the outer peripheral portions Y are arranged over the four portions $L_A$, $L_B$, $L_C$ and $L_D$ extending in the outer peripheral direction. The arrangement of the outer peripheral portion X between the two adjacent outer peripheral portions Y generates a significance of providing the tapered portion 124 at the boundary portion between the outer peripheral portion X and the outer peripheral portion Y.

The alternate arrangement of the outer peripheral portions X and the outer peripheral portions Y means that the outer peripheral portions X are also arranged over the four portions extending in the outer peripheral direction. According to one embodiment, when observing the honeycomb formed body 100, 200 in a cross section perpendicular to the height direction, two pairs of outer peripheral portions X facing each other across the center of gravity of each of the honeycomb molded bodies 100, 200 can be formed. In this case, the honeycomb formed body can be easily chucked without defects such as crushing by gripping one pair or two pairs of outer peripheral portions X, among the two pairs of opposing outer peripheral portions X.

Although the four length portions $L_A$, $L_B$, $L_C$ and $L_D$ forming the outer peripheral portions Y may be arranged at different distances across the outer peripheral portion X therebetween, it is preferable that the four length portions $L_A$, $L_B$, $L_C$ and $L_D$ are arranged at equal distances in terms of homogeneity of the honeycomb formed body. Therefore, in a preferable embodiment, $0.8 \leq D_{BC}/D_{AB} \leq 1.2$, $0.8 \leq D_{CD}/D_{AB} \leq 1.2$, and $0.8 \leq D_{DA}/D_{AB} \leq 1.2$ are simultaneously satisfied, and in a more preferred embodiment, $0.9 \leq D_{BC}/D_{AB} \leq 1.1$, $0.9 \leq D_{CD}/D_{AB} \leq 1.1$, and $0.9 \leq D_{DA}/D_{AB} \leq 1.1$ are simultaneously established, and in a further more preferred embodiment, $D_{AB} = D_{BC} = D_{CD} = L_{DA}$ is established, in which $D_{AB}$ is a distance between $L_A$ and $L_B$ along the outer peripheral direction, $D_{BC}$ is a distance between $L_B$ and $L_C$ along the outer peripheral direction, $D_{CD}$ is a distance between $L_C$ and $L_D$ along the outer peripheral direction, and $D_{DA}$ is a distance between the $L_D$ and the $L_A$ along the outer peripheral direction.

According to the condition (3), outer peripheral portion X includes a tapered portion 124 having a gradually decreasing thickness toward a boundary portion with the outer peripheral portion Y. The outer peripheral portions X having the tapered portion 124 allow significant suppression of the generation of cracks during the firing of the honeycomb formed body. As described above, the outer peripheral portions X are arranged over the four portions extending in the outer peripheral direction. In order to effectively suppress the generation of cracks, both ends of each portion in the outer peripheral direction preferably have the tapered portion 124.

According to the condition (4), the tapered portion 124 requires a length equal to or more than one time of an average cell pitch in the outer peripheral direction until thickness of the outer peripheral wall 122 is halved. The tapered portion 124 preferably requires a length equal to or more than 1.5 times, more preferably equal to or more than 2.0 times, of an average cell pitch in the outer peripheral direction until thickness of the outer peripheral wall 122 is halved. The tapered portion 124 exhibits a higher effect of suppressing the generation of cracks by gradually decreasing the thickness as it approaches the boundary portion with the outer peripheral portion Y, rather than by sharply decreasing the thickness. In the tapered portion 124, no upper limit is specifically set to the length in the outer peripheral direction until thickness of the outer peripheral wall 122 is halved. However, it is preferable that the tapered portion 124 require a length equal to or less than 20 times, more preferably equal to or less than 10 times of an average cell pitch in the outer peripheral direction until thickness of the outer peripheral wall 122 is halved, in terms of easy chucking for fixing when the honeycomb formed body is subject to processing such as cutting and/or transporting.

The average cell pitch of the honeycomb formed body is not particularly limited. However, in terms of decreasing a pressure loss when a fluid flows through the honeycomb structure, the average cell pitch may preferably be 1.0 mm or more, and more preferably 1.2 mm or more, and still more preferably 1.3 mm or more. However, in terms of increasing surface areas of the partition walls to increase collection areas and of suppressing an increase in pressure loss during particulate deposition, the average cell pitch may preferably be 3.0 mm or less, and more preferably 2.5 mm or less, and still more preferably 2.0 mm or less.

As used herein, the average cell pitch refers to a value obtained by the following calculation. First, the area of an end face excluding the outer peripheral wall of the honeycomb formed body is divided by the number of cells (excluding plugged imperfect cells) to calculate an area per cell. Then, a square root of the area per cell is calculated, which is considered to be the average cell pitch.

FIGS. 3-1 and 3-2 each illustrates a method for measuring the length in the outer peripheral direction of the tapered portion 124 until thickness of the outer peripheral wall 122 is halved when observing the honeycomb formed body 100, 200 in the cross section perpendicular to the height direction. As used herein, the thickness of the outer peripheral wall 122 refers to a length of a portion in which a straight line M drawn from a center of gravity O of a rectangular cell where the center of gravity is present at a position closest to a center of gravity of the honeycomb formed body 100 and 200, toward the outer peripheral wall 122, passes through the outer peripheral wall 122 (see FIG. 3-1). It should be noted that some of the cells 118 adjacent to the outer peripheral wall 122 may have been plugged insides so that boundaries with the outer peripheral wall 122 are unclear, but such cells are excluded from the thickness measurement points.

Referring to FIG. 3-2, according to the definition of the outer peripheral wall 122, one can identify an outer surface point having thickness T of the outer peripheral wall 122 which is the starting point of the tapered portion 124, and an outer surface point where the thickness of the outer peripheral wall 122 are halved into T/2. A length S along the outer periphery of the tapered portion 124 between the two points is then measured, and the length S is defined as the length of the tapered portion 124 in the outer peripheral direction until thickness of the outer peripheral wall 122 is halved.

It is preferable that an average thickness of the outer peripheral wall 122 excluding the tapered portions 124 be thinner, in terms of suppressing the generation of cracks. More particularly, the average thickness of the outer peripheral wall 122 excluding the tapered portion 124 may preferably be 1.5 mm or less, and more preferably 1.3 mm or less, and still more preferably 1.1 mm or less. From the viewpoint of suppressing the generation of cracks, the lower limit of the average thickness of the outer peripheral wall 122 excluding the tapered portions 124 is not particularly set, but from the viewpoint of facilitating the chucking of the honeycomb formed body for fixing when it is subjected to processing such as cutting and/or transporting, the lower limit may be preferably 0.2 mm or more, and more preferably 0.3 mm or more, and still more preferably 0.4 mm or more.

Cracks generated during the firing of the honeycomb formed body tend to progress from the end face side. Therefore, the cross-sectional portion satisfying the above four condition is preferably provided near both end faces of the honeycomb formed body. Therefore, in the honeycomb formed body 100 according to the first embodiment, the above four conditions are satisfied by a first cross-sectional portion over a length of 10% or more, preferably 20% or more, more preferably 30% or more, of the height of the honeycomb formed body 100, in the height direction (cell extending direction) of the honeycomb formed body 100 from the first end face 114, and by a second cross-sectional portion over a length of 10% or more, preferably 20% or more, more preferably 30% or more, of the height of the honeycomb formed body 100 in the height direction of the honeycomb formed body 100 from the second end face 116. In terms of more effectively suppressing the generation of cracks, it is more preferable that the cross-sectional portion satisfying the above four conditions extend over the entire height direction of the honeycomb formed body 200 as in the honeycomb formed body 200 according to the second embodiment.

(1-2. Internal Structure)

FIG. 4 shows a schematic view of a cross section parallel to a height direction (cell extending direction) of a honeycomb formed body 400 according to one embodiment of the present invention. FIG. 5 shows a schematic view of a cross section parallel to a height direction (cell extending direction) of a honeycomb formed body 500 according to another embodiment of the present invention.

The honeycomb formed body 400 according the embodiment of FIG. 4 is a pillar shaped honeycomb formed body including: an outer peripheral wall 102; and partition walls 112 defining a plurality of cells extending from a first end face 114 having a fluid inlet to a second end face having a fluid outlet. The honeycomb formed body 400 according to the embodiment is of a flow-through type in which both ends of each cell are open to the first end face 114 and the second end face 116, respectively, and the fluid flowing in from the inlet of the cell can flow out from the outlet of the cell.

As with the honeycomb structure for supporting a catalyst according to the embodiment of FIG. 4, the honeycomb formed body 500 according to the embodiment of FIG. 5 is a pillar shaped honeycomb formed body including partition walls 112 defining a plurality of cells extending from a first end face 114 having a fluid inlet and a second end face 116 having a fluid outlet. However, the honeycomb formed body 500 according to this embodiment is different from the embodiment of FIG. 4 in that the honeycomb formed body 500 is of a wall flow type having cells in which one end is open and the other end is plugged.

Specifically, the honeycomb formed body 500 according to the embodiment in FIG. 5 includes: an outer peripheral wall 102; a plurality of first cells 118a which are disposed inside the outer peripheral wall 102, the first cells 118a extending from a first end face 114 to a second end face 116, the first end face 114 being opened and the second end face 116 having a plugged portion 502; and a plurality of second cells 118b which are disposed inside the outer peripheral wall 102, the second cells 118b extending from the first end face 114 to the second end face 116, the first end face 114 having a plugged portion 502 and the second end face 116 being opened. Further, the honeycomb formed body 500 includes partition walls 112 that define the first cells 118a and the second cells 118b, and is arranged such that the first cells 118a and the second cells 118b are adjacent to each other across the partition walls 112. In the honeycomb formed body 500 according to the embodiment of FIG. 5, all the first cells 118a are adjacent to the second cells 118b, and all the second cells 118b are adjacent to the first cells 118a. However, not all the first cells 118a may be necessarily adjacent to the second cells 118b, and not all the second cells 118b may be necessarily adjacent to the first cells 118a.

The thickness of the partition wall 112 is not particularly limited. However, in terms of increasing the strength of the honeycomb formed body, the thickness of the partition wall is preferably 0.05 mm or more, and more preferably 0.07 mm or more, and still more preferably 0.1 mm or more. Further, the thickness of the partition wall 112 is preferably 0.5 mm or less, and more preferably 0.45 mm or less, and still more preferably 0.4 mm or less, in terms of suppressing pressure loss.

The thickness of the partition wall 112 refers to a length of a partition wall interposed between two adjacent cells, in a direction of connecting the centers of gravity of these cells, when observing the honeycomb formed body in a cross section perpendicular to the height direction.

The length of the honeycomb formed body in the height direction (cell extending direction) is not particularly limited. However, if it is longer, an amount of a catalyst can be increased, whereas if it is too long, the thermal shock resistance will be decreased. Therefore, the length is preferably from 50 to 450 mm, and more preferably from 60 to 400 mm, and even more preferably 70 to 360 mm.

(1-3. Outer Shape)

The outer shape of the honeycomb formed body is not particularly limited as long as it has a pillar shape. For example, the honeycomb formed body may have a pillar shape with circular end faces (cylindrical shape), a pillar shape with oval shaped end faces, and pillar shape with polygonal end faces (square, pentagonal, hexagonal, heptagonal, or octagonal shape, or the like).

The size of the honeycomb formed body is not particularly limited. However, cracks tend to be generated when producing a large honeycomb structure. Therefore, in this case, the honeycomb formed body according to the present invention can be effectively used. When producing such a large honeycomb structure, a bottom area of the honeycomb formed body is, for example, 200 cm$^2$ or more, or 280 cm$^2$ or more, or 360 cm$^2$ or more. However, thermal shock resistance is decreased when the bottom area is excessively large. Therefore, it is preferably 1000 cm$^2$ or less, and more preferably 860 cm$^2$ or less.

(1-4. Production of Honeycomb Formed Body)

The honeycomb formed body can be produced by, for example, kneading a raw material composition containing a ceramic raw material, a dispersion medium, a pore former and a binder to form a green body and then extruding the green body. An additive such as a dispersant may be added to the raw material composition as needed. In the extrusion molding, a die having a desired overall shape, cell shape, partition wall thickness, cell density and the like can be used.

The outer peripheral portions Y where the partition walls are exposed may be formed while forming the honeycomb formed body or may be formed prior to the firing after forming the honeycomb formed body. However, because of process designs (labors), the outer peripheral portions Y are preferably formed during the forming of the honeycomb formed body. Examples of a method for forming the outer peripheral portions Y while forming the honeycomb formed body include a method for extrusion-molding the honeycomb formed body by providing a jig having protruding portions which hinder the formation of the outer peripheral wall, on the upstream side of the die for extrusion-molding. FIG. 6 shows a schematic view of such a jig 600. The jig 600 includes an annular frame 602 and a plurality of protruding portions 604 each protruding toward the inner peripheral side of the annular frame. Once the green body passes inside the annular frame 602 of the jig 600 during the extrusion molding, the flow of the green body is hindered by the protruding portions 604, and the outer peripheral portions Y where the partition walls are exposed are formed at these portions. According to the method, it is possible to produce the outer peripheral portions Y extending over the entire height direction of the honeycomb formed body as shown in FIG. 2.

The ceramic raw material remains after the firing and is a raw material for a portion forming the skeleton of the honeycomb structure as ceramics. The ceramic raw material can be provided in the form of powder, for example. Examples of the ceramic raw material include raw materials for obtaining ceramics such as cordierite, mullite, zircon, aluminum titanate, silicon carbide, silicon-silicon carbide composite, silicon nitride, zirconia, spinel, indialite, sapphirin, corundum, and titania. Specific examples of the raw material include, but are not limited to, silica, talc, aluminum hydroxide, alumina, kaolin, serpentine, pyroferrite, brucite, boehmite, mullite, magnesite and the like. The ceramic raw material may be used alone or in combination with two or more. For filter applications such as DPF and GPF, it is possible to suitably use cordierite, silicon carbide or the silicon-silicon carbide composite as ceramics.

The pore former is not particularly limited as long as it forms a pore after firing. Examples of the pore former include flour, starch, foaming resins, water absorbent resins, silica gel, carbon (for example, graphite and coke), ceramic balloons, polyethylene, polystyrene, polypropylene, nylon, polyester, acryls, phenols, foamed resins (after foaming), foaming resins (before foaming), and the like. The pore former may be used alone or in combination with two or more. The content of the pore former is preferably 0.5 parts by mass or more, and more preferably 2 parts by mass or more, and even more preferably 3 parts by mass, relative to 100 parts by mass of the ceramic raw material, in terms of increasing the porosity of the honeycomb structure. The content of the pore former is preferably 10 parts by mass or less, and more preferably 7 parts by mass or less, and even more preferably 4 parts by mass or less, relative to 100 parts by mass of the ceramic raw material, in terms of ensuring the strength of the honeycomb structure.

The binder includes organic binders such as methyl cellulose, hydroxypropoxyl cellulose, hydroxyethyl cellulose, carboxymethyl cellulose, and polyvinyl alcohol. In particular, methyl cellulose may be suitably used in combination with hydroxypropoxyl cellulose. In terms of increasing the strength of the honeycomb formed body, the content of the binder is preferably 4 parts by mass or more, and more preferably 5 parts by mass or more, and more preferably 6 parts by mass or more, relative to 100 parts by mass of the ceramic raw material. In terms of suppressing the generation of cracks due to abnormal heat generation in the firing step, the content of the binder is preferably 9 parts by mass or less, and more preferably 8 parts by mass or less, and even more preferably 7 parts by mass or less, relative to 100 parts by mass of the ceramic raw material. The binder may be used alone or in combination with two or more.

The dispersant that can be used includes surfactants such as ethylene glycol, dextrin, fatty acid soaps, and polyalcohol. The dispersant may be used alone or in combination with two or more types. The content of the dispersant is preferably from 0 to 2 parts by mass relative to 100 parts by mass of the ceramic raw material.

The dispersion medium includes water, mixed solvents of water and organic solvents such as alcohol. In particular, water may be suitably used.

The content of water in the honeycomb formed body before carrying out the drying step is preferably from 20 to 90 parts by mass, and more preferably from 60 to 85 parts by mass, and even more preferably from 70 to 80 parts by mass, relative to 100 parts by mass of the ceramic raw material. The content of water in the honeycomb formed body of 20 parts by mass or more relative to 100 parts by mass of the ceramic raw material can facilitate to provide an advantage that the quality of the honeycomb formed body is easily stabilized. The content of water in the honeycomb formed body of 90 parts by mass or less relative to 100 parts by mass of the ceramic raw material can lead to a decreased amount of shrinkage during the drying and allow suppression of deformation. As used herein, the content of water in the honeycomb formed body refers to a value measured by a loss on drying method.

In one embodiment of the honeycomb formed body, all the cells may be penetrated from the first end face to the second end face. In another embodiment, the honeycomb formed body can have a structure including: a plurality of first cells extending from the first end face to the second end face, the first end face being opened and the second end face being plugged; and a plurality of second cells adjacent to at least one first cell via the partition wall, the first end face being plugged and the second end face being opened. A method for plugging the end faces of the honeycomb formed body is not particularly limited, and a well-known method may be adopted.

A method of forming plugged portions will be exemplarily described. A plugging slurry is stored in a storage container. A mask having opened portions at positions corresponding to the cells where the plugged portions are to be formed is then attached to one end face. The end face to which the mask has been attached is immersed in the storage container, and the opened portions are filled with the plugging slurry to form plugged portions. For the other end face, the plugged portions can be formed by the same method.

The plugged portions may be made of any material, including, but not limited to, preferably ceramics, in terms of strength and heat resistance. The ceramics that can be preferably used include ceramics materials containing at least one selected from the group consisting of cordierite, mullite, zircon, aluminum titanate, silicon carbide, silicon-silicon carbide composite, silicon nitride, zirconia, spinel, indialite, sapphirin, corundum, and titania. The plugged portions may be preferably made of a material containing 50% by mass or more of these ceramics in total, and more preferably made of a material containing 80% by mass or more of these ceramics. The plugged portions can have the same material composition as that of the main portion of the honeycomb formed body, because it can allow the same expansion ratio during the firing and lead to improvement of durability.

After forming the optional plugged portions, a drying step is carried out. In the drying step, conventionally known drying methods may be used such as hot air drying, microwave drying, dielectric drying, drying under reduced pressure, vacuum drying, and freeze drying. Among them, a combined drying method of the hot air drying with the microwave drying or dielectric drying is preferable from the viewpoint that the entire formed body can be quickly and uniformly dried. When forming plugged portions, the plugged portions are formed on both end faces of the dried honeycomb formed body, and the plugged portions are then dried to obtain a honeycomb dried body.

(1-5. Honeycomb Structure)

In one embodiment, the present invention provides:

a method for producing a honeycomb structure, comprising the steps of:

firing the honeycomb formed body to prepare a honeycomb fired body;

grinding an outer peripheral wall of the honeycomb fired body to prepare a ground honeycomb fired body; and forming an outer peripheral coating wall on an outer periphery of the ground honeycomb fired body.

Firing conditions can be appropriately determined depending on the materials of the honeycomb formed body. For example, when the material of the honeycomb formed body is cordierite, the firing temperature is preferably from 1380 to 1450° C., and more preferably from 1400 to 1,440° C. Further, a firing time is preferably from about 3 to 10 hours. Depending on the material of the honeycomb formed body, a degreasing step may be optionally performed before firing the honeycomb formed body.

After firing, the outer peripheral wall of the honeycomb fired body is ground to prepare a ground honeycomb fired body. A method for grinding the outer peripheral wall of the honeycomb fired body is not particularly limited, and a known grinding method may be used. The grinding method can be carried out using a cylindrical grinding machine or the like.

The outer peripheral coating wall is then formed on the outer periphery of the ground honeycomb fired body to produce a honeycomb structure. The outer peripheral coating wall is preferably formed by coating an outer peripheral coating material onto the outer periphery of the ground honeycomb fired body. The outer peripheral coating material is not particularly limited, and a known peripheral coating material can be used. The method for coating the outer peripheral coating material is not particularly limited, and a known method can be used.

The honeycomb structure can support a catalyst. Therefore, according to one embodiment of the present invention, there is provided a method for producing a catalyst-supported honeycomb structure, including a step of supporting a catalyst on the honeycomb structure according to the present invention.

The step of supporting the catalyst on the honeycomb structure includes, for example, a method for bringing a catalyst composition slurry into contact with the honeycomb structure, and then drying and firing it.

The catalyst composition slurry preferably contains an appropriate catalyst, depending on the applications. The catalyst includes, but not limited to, oxidation catalysts for removing pollutants such as soot, nitrogen oxide (NOx), soluble organic components (SOFs), hydrocarbons (HCs) and carbon monoxide (CO); reduction catalysts; and three-way catalysts. In particular, when the honeycomb structure according to the present invention is used as a filter such as a DPF or a GPF, particulate matters (PMs) such as soot and SOFs in an exhaust gas are collected by the filter, so that it is preferable to support catalysts such as those acting to assist the combustion of the particulate matters. Examples of the catalyst include noble metals (Pt, Pd, Rh, and the like), alkali metals (Li, Na, K, Cs, and the like), alkaline earth metals (Ca, Ba, Sr, and the like), rare earths (Ce, Sm, Gd, Nd, Y, Zr, Ca, La, Pr, and the like), and transition metals (Mn, Fe, Co, Ni, Cu, Zn, Sc, Ti, V, Cr, and the like).

EXAMPLES

Hereinafter, Examples are illustrated for better understanding of the present invention and its advantages, but the present invention is not limited to Examples.

Comparative Example 1

Silica, talc, and alumina were used as cordierite-forming raw materials. To 100 parts by mass of cordierite-forming raw materials were added 25 parts by mass of water as a dispersion medium, 10 parts by mass of a pore former, 5 parts by mass of an organic binder, and 0.5 parts by mass of a dispersant, and they were mixed and kneaded to prepare a green body. Coke was used as the pore former, hydroxypropylmethyl cellulose was used as the organic binder, and a fatty acid soap was used as the dispersant. The pore former having an average particle diameter of 40 μm was used. As a mixing apparatus, a Lödige mixer was used, and as a kneading apparatus, a kneader and a de-airing pug-mill were used.

The kneaded green body thus obtained was extruded through a predetermined die and then dried to prepare a honeycomb formed body having the following structure:

Overall Shape: cylindrical (a diameter of 267 mm x a height of 203 mm);
Cell Cross Sectional Shape: square;
Average Cell Pitch: 1.27 mm;
Cell Density: 400 cpsi (about 62/cm$^2$);
Thickness of Partition Wall: 6 mil (about 0.15 mm) (a nominal value based on the specification for the die);
Average Thickness of Outer Peripheral Wall: as shown in Table 1 (one end face of the honeycomb formed body was observed, the thicknesses of the outer peripheral wall at four positions where a central angle of the adjacent measuring points differed by 90° was measured, and the average value was calculated).

The honeycomb formed body was fired to obtain a honeycomb fired body. The firing was carried out in the atmosphere at a temperature of from 1,410 to 1,440° C. for 5 hours with one end face of the honeycomb formed body facing downward and placed on a shelf board.

The honeycomb fired body was visually confirmed for the presence or absence of cracks and a degree of cracks. The obtained results are shown in Table 1. The evaluation was carried out according to the following criteria:

A: No crack;
B: One or more cracks having a depth of 5 mm or less in the radial direction; and
C: One or more cracks having a depth of more than 5 mm in the radial direction.

Examples 1 to 7, Comparative Examples 2 to 4

The same green body as that of Comparative Example 1 was prepared, extruded through a predetermined die, and dried to prepare each honeycomb formed body having the following structure according to the test numbers:

Overall Shape: cylindrical (a diameter of 267 mm x a height of 203 mm);
Cell Cross Sectional Shape: square;
Average Cell Pitch: 1.27 mm;
Cell Density: 400 cpsi (about 62/cm$^2$);
Thickness of Partition Wall: 6 mil (about 0.15 mm) (a nominal value based on the specification for the die);
Average Thickness of Outer Peripheral Wall (excluding tapered portions): as shown in Table 1 (one end face of the honeycomb formed body was observed, the thicknesses of the outer peripheral wall at four positions where a central angle of the adjacent measuring points differed by 90° was measured, and the average value was calculated).

For the extrusion molding, an annular jig having protruding portions at four positions on an inner circumferential side as shown in FIG. 6 was installed upstream of the die, so that formation of the outer peripheral wall was partially hindered. As a result, four outer peripheral portions X where the partition walls were covered with the outer peripheral wall and four outer peripheral portions Y where the partition walls were exposed were alternately arranged at four positions in the outer peripheral direction, respectively. The outer peripheral portions X and the outer peripheral portions Y extended over the entire height direction of the honeycomb formed body, respectively.

When observing the honeycomb formed body in a cross section perpendicular to the height direction, the outer peripheral portions Y are divided into four portions: a length portion $L_A$ symmetrically formed with respect to an intersection portion between a straight line A and the outer peripheral portion as a center; a length portion $L_B$ symmetrically formed with respect to an intersection portion between a straight line B and the outer peripheral portion as a center; a length portion $L_C$ symmetrically formed with respect to an intersection portion between a straight line C and the outer peripheral portion as a center; and a length portion $L_D$ symmetrically formed with respect to an intersection portion between a straight line D and the outer peripheral portion as a center, in which four straight lines extending from a center of gravity of a square cell where the center of gravity is present at a position closest to a center of gravity of the cross section, through four corners of the square cell, toward the outer periphery, are defined as the straight line A (45° direction), the straight line B (135° direction), the straight line C (225° direction), and the straight line D (315° direction), respectively.

The lengths of $L_A$, $L_B$, $L_C$ and $L_D$ and the total length of them were varied as shown in Table 1 according to the test numbers. In one test number, the jig was designed such that $L_A$, $L_B$, $L_C$, and $L_D$ had the same length. However, in the honeycomb formed body actually obtained, some variations occurred along the length direction. Therefore, in Table 1, the lengths of $L_A$, $L_B$, $L_C$, and $L_D$ and the total length of them are shown in certain ranges. In Table 1, "Peripheral Length" refers to an outer peripheral length of the honeycomb formed body assuming that no outer peripheral wall is present in the honeycomb formed body.

The honeycomb formed bodies of all the test numbers were provided with tapered portions at both circumferential ends of each outer peripheral portion X, the tapered portions each having a gradually decreasing thickness of the outer peripheral wall as it approached a boundary portion with an adjacent outer peripheral portion Y. However, in each of the tapered portion, a length S in the outer peripheral direction until thickness of the outer peripheral wall was halved was changed depending on the test numbers as shown in Table 1. The length S for each test number was expressed as a ratio to each average cell pitch.

The honeycomb formed body of each test number was fired under the same conditions as those of Comparative Example 1 to obtain a honeycomb fired body. The honeycomb fired body of each test number was visually confirmed for the presence or absence of cracks and a degree of cracks. The obtained results are shown in Table 1. Evaluation criteria are the same as those of Comparative Example 1. For each of Examples 1, 4 and 7, the same evaluation was performed on 100 honeycomb formed bodies produced under the same conditions, and as a result, no crack was found.

Comparative Example 5

The same green body as that of Comparative Example 1 was prepared, extruded through a predetermined die, and then dried to prepare a honeycomb formed body having the following structure according to the test number:
  Overall Shape: cylindrical (a diameter of 267 mm x a height of 203 mm);
  Cell Cross Sectional Shape: square;
  Average Cell Pitch: 1.27 mm;
  Cell Density: 400 cpsi (about 62/cm$^2$);
  Thickness of Partition Wall: 6 mil (about 0.15 mm) (a nominal value based on the specification for the die);
  Average Thickness of Outer Peripheral Wall (excluding tapered portions): as shown in Table 1 (one end face of the honeycomb formed body was observed, the thicknesses of the outer peripheral wall at four positions where a central angle of the adjacent measuring points differed by 90° were measured, and the average value was calculated).

In the extrusion molding, an annular jig having protruding portions at four positions on an inner circumferential side as shown in FIG. 6 was installed upstream of the die, so that formation of the outer peripheral wall was partially hindered. As a result, four outer peripheral portions X where the partition walls were covered with the outer peripheral wall and four outer peripheral portions Y where the partition walls were exposed were alternately arranged at four positions in the outer peripheral direction, respectively. The outer peripheral portions X and the outer peripheral portions Y extended over the entire height direction of the honeycomb formed body, respectively.

When observing the honeycomb formed body in a cross section perpendicular to the height direction, the outer peripheral portions Y are divided into four portions: a length portion $L_{A'}$ symmetrically formed with respect to an intersection portion between a straight line A' and the outer peripheral portion as a center; a length portion $L_{B'}$ symmetrically formed with respect to an intersection portion between a straight line B' and the outer peripheral portion as a center; a length portion $L_{C'}$ symmetrically formed with respect to an intersection portion between a straight line C' and the outer peripheral portion as a center; and a length portion $L_{D'}$ symmetrically formed with respect to an intersection portion between a straight line D' and the outer peripheral portion as a center, in which four straight lines extending from a center of gravity of a square cell where the center of gravity is present at a position closest to a center of gravity of the cross section, through four corners of the square cell, toward the outer periphery, are defined as the straight line A' (0° direction), the straight line B' (90° direction), the straight line C' (180° direction), and the straight line D' (270° direction), respectively.

The total length of $L_{A'}$, $L_{B'}$, $L_{C'}$ and $L_{D'}$ was as shown in Table 1. In addition, the die was designed such that $L_{A'}$, $L_{B'}$, $L_{C'}$ and $L_{D'}$ had the same length. However, some variations occurred along the length direction, as with the other experimental examples.

The honeycomb formed body was provided with tapered portions at both circumferential ends of each outer peripheral portion X, the tapered portions each having a gradually decreasing thickness of the outer peripheral wall as it approached a boundary portion with an adjacent outer peripheral portion Y. A length S of each tapered portion in the outer peripheral direction until thickness of the outer peripheral wall was halved was as shown in Table 1. The length S was expressed as a ratio to the average cell pitch.

The honeycomb formed body was fired under the same conditions as those of Comparative Example 1 to obtain a honeycomb fired body. The honeycomb fired body was visually confirmed for the presence or absence of cracks and a degree of cracks. The obtained results are shown in Table 1. Evaluation criteria are the same as those of Comparative Example 1.

Comparative Example 6

The same green body as that of Comparative Example 1 was prepared, extruded through a predetermined die, and then dried to prepare a honeycomb formed body having the following structure according to the test number:
 Overall Shape: cylindrical (a diameter of 267 mm x a height of 203 mm);
 Cell Cross Sectional Shape: square; Average Cell Pitch: 1.27 mm;
 Cell Density: 400 cpsi (about 62/cm$^2$);
 Thickness of Partition Wall: 6 mil (about 0.15 mm) (a nominal value based on the specification for the die);
 Average Thickness of Outer Peripheral Wall (excluding tapered portions): as shown in Table 1 (one end face of the honeycomb formed body was observed, the thicknesses of the outer peripheral wall at four positions where a central angle of the adjacent measuring points differed by 90° were measured, and the average value was calculated).

During the extrusion molding, an annular jig having protruding portions at three positions on an inner circumferential side was installed upstream of the die, so that formation of the outer peripheral wall was partially hindered. As a result, three outer peripheral portions X where the partition walls were covered with the outer peripheral wall and three outer peripheral portions Y where the partition walls were exposed were alternately arranged at three positions in the outer peripheral direction, respectively. The outer peripheral portions X and the outer peripheral portions Y extended over the entire height direction of the honeycomb formed body, respectively.

When observing the honeycomb formed body in a cross section perpendicular to the height direction, the outer peripheral portions Y are divided into three portions: a length portion $L_A$ symmetrically formed with respect to an intersection portion between a straight line A and the outer peripheral portion as a center; a length portion $L_B$ symmetrically formed with respect to an intersection portion between a straight line B and the outer peripheral portion as a center; and a length portion $L_C$ symmetrically formed with respect to an intersection portion between a straight line C and the outer peripheral portion as a center, in which three straight lines of four straight lines extending from the center of gravity of a square cell where the center of gravity is present at a position closest to the center of gravity of the cross section, through four corners of the square cell, toward the outer periphery, are defined as the straight line A (45° direction), the straight line B (135° direction), and the straight line C (225° direction), respectively.

The total length of $L_A$, $L_B$, and $L_C$ was as shown in Table 1. The lengths of $L_A$, $L_B$ and $L_C$ were the same.

The honeycomb formed body was provided with tapered portions at both circumferential ends of each outer peripheral portion X, the tapered portions each having a gradually decreasing thickness of the outer peripheral wall as it approached a boundary portion with an adjacent outer peripheral portion Y. A length S of each tapered portion in the outer peripheral direction until thickness of the outer peripheral wall was halved was as shown in Table 1. The length S was expressed as a ratio to the average cell pitch.

The honeycomb formed body was fired under the same conditions as those of Comparative Example 1 to obtain a honeycomb fired body. The honeycomb fired body was visually confirmed for the presence or absence of cracks and a degree of cracks. The obtained results are shown in Table 1. Evaluation criteria are the same as those of Comparative Example 1.

TABLE 1

|  | Arrangement Direction of Outer Peripheral Portions Y | Number of Outer Peripheral Portions Y | Total Length of $L_A$, $L_B$, $L_C$ and $L_D$ (or $L_{A'}$, $L_{B'}$, $L_{C'}$ and $L_{D'}$)/mm | Each Length of $L_A$, $L_B$, $L_C$ and $L_D$ (or $L_{A'}$, $L_{B'}$, $L_{C'}$ and $L_{D'}$)/mm |
|---|---|---|---|---|
| Example 1 | 45°135°225°315° | 4 | 104-144 | 26-36 |
| Example 2 | 45°135°225°315° | 4 | 232-272 | 58-68 |
| Example 3 | 45°135°225°315° | 4 | 400-440 | 100-110 |
| Example 4 | 45°135°225°315° | 4 | 104-144 | 26-36 |
| Example 5 | 45°135°225°315° | 4 | 232-272 | 58-68 |
| Example 6 | 45°135°225°315° | 4 | 232-272 | 58-68 |
| Example 7 | 45°135°225°315° | 4 | 104-144 | 26-36 |
| Comparative Example 1 | — | — | — | — |
| Comparative Example 2 | 45°135°225°315° | 4 | 56-96 | 14-24 |
| Comparative Example 3 | 45°135°225°315° | 4 | 232-272 | 58-68 |
| Comparative Example 4 | 45°135°225°315° | 4 | 104-144 | 26-36 |
| Comparative Example 5 | 0°90°180°270° | 4 | 400-440 | 100-110 |
| Comparative Example 6 | 45°135°225° | 3 | 232-272 | 58-68 |

|  | Ratio of Total Length of $L_A$, $L_B$, $L_C$ and $L_D$ (or $L_{A'}$, $L_{B'}$, $L_{C'}$ and $L_{D'}$) to Peripheral Length/% | Ratio of Each Length of $L_A$, $L_B$, $L_C$ and $L_D$ (or $L_{A'}$, $L_{B'}$, $L_{C'}$ and $L_{D'}$) to Peripheral Length/% | Average Thickness of Outer Peripheral Wall Excluding Tapered Portions/mm | Length S of Tapered Portion where Thickness of Outer Peripheral Wall is Halved | Evaluation of Cracks |
|---|---|---|---|---|---|
| Example 1 | 12-17 | 3-4 | 1.3 | 1.5 Cells | A |
| Example 2 | 28-32 | 7-8 | 1.2 | 1 Cell | A |

TABLE 1-continued

| | | | | | |
|---|---|---|---|---|---|
| Example 3 | 48-52 | 12-13 | 1.3 | 1.5 Cells | A |
| Example 4 | 12-17 | 3-4 | 0.8 | 1.5 Cells | A |
| Example 5 | 28-32 | 7-8 | 1.3 | 1 Cell | A |
| Example 6 | 28-32 | 7-8 | 1.2 | 2 Cells | A |
| Example 7 | 12-17 | 3-4 | 1.5 | 1.5 Cells | B |
| Comparative Example 1 | — | — | 1.0 | — | C |
| Comparative Example 2 | 7-11 | 2-3 | 1.1 | 1.5 Cells | C |
| Comparative Example 3 | 28-32 | 7-8 | 1.2 | 0.5 Cells or less | C |
| Comparative Example 4 | 12-17 | 3-4 | 1.3 | 0.5 Cells or less | C |
| Comparative Example 5 | 48-52 | 12-13 | 1.3 | 1.5 Cells | C |
| Comparative Example 6 | 28-32 | 7-8 | 1.2 | 1.5 Cells | C |

DISCUSSION

In each of Examples 1 to 7, the outer peripheral portions Y where the partition walls were exposed were appropriately formed at four positions and the tapered portions were also appropriately formed, so that the generation of cracks was suppressed.

However, in Comparative Example 1, the outer peripheral portions Y where the partition walls were exposed were not formed, so that cracks were generated.

In Comparative Example 2, although four outer peripheral portions Y where the partition walls were exposed were formed, the lengths of the four length portions $L_A$, $L_B$, $L_C$ and $L_D$ forming the outer peripheral portions Y were insufficient, so that cracks were generated.

In each of Comparative Example 3 and Comparative Example 4, although four outer peripheral portions Y where the partition walls were exposed were formed, the length S of each tapered portion in the outer peripheral direction until thickness of the outer peripheral wall was halved was shorter, so that cracks were generated. In each of Comparative Example 3 and Comparative Example 4, it was necessary to fire slowly the honeycomb formed body over about 10 to 20 additional hours as compared with Examples 1 to 7, in order to perform the firing without generating cracks.

In Comparative Example 5, although four outer peripheral portions Y where the partition walls were exposed were formed, the arrangement directions thereof were inappropriate, so that cracks were generated.

In Comparative Example 6, although the outer peripheral portions Y where the partition walls were exposed were formed, the outer peripheral portions were provided at only three portions, so that cracks were generated.

DESCRIPTION OF REFERENCE NUMERALS

100, 200, 400, 500 honeycomb formed body
110 pillar shaped honeycomb structure
112 partition wall
114 first end face
116 second end face
118 cell
118a first cell
118b second cell
120 outer peripheral portion
122 outer peripheral wall
124 tapered portion
600 jig
602 annular frame
604 protruding portion

The invention claimed is:
1. A honeycomb formed body containing a ceramics raw material, the honeycomb formed body comprising:
a pillar shaped honeycomb structure portion having a plurality of rectangular cells, the plurality of rectangular cells being defined by partition walls and extending from a first end face to a second end face to form flow paths;
an outer peripheral portion comprising: outer peripheral portions X where the partition walls are covered with an outer peripheral wall; and outer peripheral portions Y where the partition walls are exposed;
wherein the honeycomb formed body has a cross-sectional portion satisfying the following four conditions:
the outer peripheral portions Y are arranged over four portions: a length portion $L_A$ of 3% or more and 14% or less of an outer peripheral length including an intersection portion between a straight line A and the outer peripheral portion, wherein the outer peripheral wall is not present; a length portion $L_B$ of 3% or more and 14% or less of the outer peripheral length including an intersection portion between a straight line B and the outer peripheral portion, wherein the outer peripheral wall is not present; a length portion $L_C$ of 3% or more and 14% or less of the outer peripheral length including an intersection portion between a straight line C and the outer peripheral portion, wherein the outer peripheral wall is not present; and a length portion $L_D$ of 3% or more and 14% or less of the outer peripheral length including an intersection portion between a straight line D and the outer peripheral portion, wherein the outer peripheral wall is not present; in which, when observing the honeycomb formed body in a cross section perpendicular to a height direction, the straight line A, the straight line B, the straight line C, and the straight line D respectively represent four straight lines extending from a center of gravity of a rectangular cell where of the plurality of rectangular cells the center of gravity is present at a position closest to a center of gravity of the cross section, through four corners of the rectangular cell of the plurality of rectangular cells, toward an outer periphery;
the outer peripheral portions X and the outer peripheral portions Y are alternately arranged in an outer peripheral direction;
each of the outer peripheral portions X comprises a tapered portion having a gradually decreasing thickness of the outer peripheral wall toward a boundary portion with an adjacent outer peripheral portion Y; and
the tapered portion requires a length equal to or more than one time of an average cell pitch in the outer peripheral direction until thickness of the outer peripheral wall is halved.

2. The honeycomb formed body according to claim 1, wherein the cross-sectional portion satisfying the four conditions comprises a first cross-sectional portion extending from the first end face over a length of 10% or more of a height of the honeycomb formed body in the height direction of the honeycomb formed body; and a second cross-sectional portion extending from the second end face over a length of 10% or more of the height of the honeycomb formed body in the height direction of the honeycomb formed body.

3. The honeycomb formed body according to claim 1, wherein the cross-sectional portion satisfying the four conditions extends over an entire height direction of the honeycomb formed body.

4. The honeycomb formed body according to claim 1, wherein the outer peripheral wall excluding the tapered portions has an average thickness of 1.5 mm or less.

5. The honeycomb formed body according to claim 1, wherein, for the peripheral portions Y,
   the length portion $L_A$ is symmetrically formed with respect to the intersection portion between the straight line A and the outer peripheral portion as a center,
   the length portion $L_B$ is symmetrically formed with respect to the intersection portion between the straight line B and the outer peripheral portion as a center,
   the length portion $L_C$ is symmetrically formed with respect to the intersection portion between the straight line C and the outer peripheral portion as a center, and
   the length portion $L_D$ is symmetrically formed with respect to the intersection portion between the straight line D and the outer peripheral portion as a center.

6. The honeycomb formed body according to claim 1, wherein each of the plurality of rectangular cells is a square cell.

7. The honeycomb formed body according to claim 1, wherein the honeycomb formed body has a cylindrical shape.

8. The honeycomb formed body according to claim 1, wherein the plurality of rectangular cells comprise a first cell extending from the first end face to the second end face, the first end face being opened and the second end face being plugged; and a second cell adjacent to the first cell via a partition wall of the plurality of partition walls therebetween, the second cell extending from the first end face to the second end face, the first end face being plugged and the second end face being opened.

9. A method for producing a honeycomb structure, comprising the steps of:
   firing the honeycomb formed body according to claim 1 to prepare a honeycomb fired body;
   grinding an outer peripheral wall of the honeycomb fired body to prepare a ground honeycomb fired body; and
   forming an outer peripheral coating wall on an outer periphery of the ground honeycomb fired body.

* * * * *